US009956837B2

(12) United States Patent
Gibbs

(10) Patent No.: US 9,956,837 B2
(45) Date of Patent: May 1, 2018

(54) AMPHIBIANS

(71) Applicant: Gibbs Technologies Ltd, Warwickshire (GB)

(72) Inventor: Alan Timothy Gibbs, London (GB)

(73) Assignee: Gibbs Technologies Ltd., Warwickshire (GB)

(*) Notice: Subject to any disclaimer, the term of this patent is extended or adjusted under 35 U.S.C. 154(b) by 0 days. days.

(21) Appl. No.: 14/528,846

(22) Filed: Oct. 30, 2014

(65) Prior Publication Data

US 2015/0056876 A1 Feb. 26, 2015

Related U.S. Application Data

(63) Continuation of application No. 12/674,897, filed as application No. PCT/GB2008/002886 on Aug. 22, 2008, now Pat. No. 8,888,543.

(30) Foreign Application Priority Data

Aug. 24, 2007 (GB) .................................... 09716618

(51) Int. Cl.
*B63H 19/08* (2006.01)
*B60F 3/00* (2006.01)
(52) U.S. Cl.
CPC ............ *B60F 3/003* (2013.01); *B60F 3/0061* (2013.01); *B60F 2301/04* (2013.01)
(58) Field of Classification Search
CPC .............................. B60F 3/003; B60F 2301/04
(Continued)

(56) References Cited

U.S. PATENT DOCUMENTS 3,903,831 A 9/1975 Bartlett
4,241,686 A 12/1980 Westphalen
(Continued)

FOREIGN PATENT DOCUMENTS

EP 320835 A1 6/1989
EP 341009 A1 11/1989
(Continued)

OTHER PUBLICATIONS

International Search Report, dated Dec. 2, 2008, 4 pages, from PCT/GB2008/002886 published as WO 2009/027661 dated Mar. 5, 2009.
(Continued)

*Primary Examiner* — Daniel V Venne
(74) *Attorney, Agent, or Firm* — Fulwider Patton LLP

(57) ABSTRACT

An amphibian (1) for use on land and water, comprising: a hull having a planing surface (2), and at least one retractable suspension apparatus (4) movable from a vehicle supporting position to a retracted position, comprising for each wheel (5), upper and lower suspension arms (8, 9) that are pivotably connected at inboard ends to a support structure within the hull; and are pivotably connected at outboard ends to a suspension upright (7). Upright (7) extends from a first, upper connection past a second, lower connection to a location (10) for a wheel hub mounting. The suspension upright when deployed in land use extends externally of the hull across a side face (2A) of the planing surface; while lower suspension arm (9) remains above the top of planing surface (2) throughout use of the amphibian on land. This suspension arrangement allows the hull to have no cutouts in its planing surface.

19 Claims, 5 Drawing Sheets

(58) Field of Classification Search
USPC ........... 440/12.5, 12.51, 12.52, 12.57, 12.58, 440/12.66
See application file for complete search history.

(56) References Cited

U.S. PATENT DOCUMENTS

| | | | |
|---|---|---|---|
| 4,611,820 A | 9/1986 | Massey et al. | |
| 4,958,584 A | 9/1990 | Williamson | |
| 5,531,179 A * | 7/1996 | Roycroft | B60F 3/003 |
| | | | 114/344 |
| 5,562,066 A | 10/1996 | Gere et al. | |
| 5,570,653 A | 11/1996 | Gere et al. | |
| 5,590,617 A | 1/1997 | Gere et al. | |
| 5,632,221 A | 5/1997 | Trenne et al. | |
| 5,755,173 A | 5/1998 | Rorabaugh et al. | |
| 5,769,021 A | 6/1998 | Schad | |
| 6,505,694 B2 | 1/2003 | Maguire | |
| 6,921,304 B2 | 7/2005 | Hewitt | |
| 6,945,832 B2 | 9/2005 | Roycroft | |
| 7,234,982 B2 * | 6/2007 | Longdill | B60F 3/0007 |
| | | | 280/43.17 |
| 7,371,137 B2 * | 5/2008 | Rees | B60F 3/0007 |
| | | | 180/209 |
| 7,618,050 B2 * | 11/2009 | Longdill | B60F 3/0007 |
| | | | 280/124.134 |
| 9,102,389 B2 * | 8/2015 | King | B60F 3/003 |
| 2006/0234567 A1 | 10/2006 | Longdill et al. | |
| 2009/0005939 A1 | 1/2009 | Dueckinghaus et al. | |
| 2010/0089671 A1 | 4/2010 | Trunkenpolz | |

FOREIGN PATENT DOCUMENTS

| | | |
|---|---|---|
| GB | 2400822 A | 10/2004 |
| SE | 458760 B | 5/1989 |
| SU | 1752584 A1 | 8/1992 |
| WO | 0244006 A1 | 6/2002 |
| WO | 2005028300 A1 | 3/2005 |
| WO | 2008023191 A2 | 2/2008 |

OTHER PUBLICATIONS

United Kingdom Examination Report, dated Nov. 14, 2007, 7 pages.
International Preliminary Search Report, dated Feb. 24, 2010, 10 pages, from PCT/GB2008/002886, published as WO 2009/027661 dated Mar. 5, 2009.

* cited by examiner

AMPHIBIANS

This application is a continuation application of U.S. Ser. No. 12/674,897 filed Apr. 19, 2011, which is a 371 of international application PCT/GB2008/002886 filed Aug. 22, 2008, which is based upon GB Application Serial No. 0716618.4 filed Aug. 24, 2007, the entirety of which are incorporated herein by reference.

This invention relates to an amphibian for use on land and water. In particular, this invention relates to an amphibian comprising at least one retractable suspension apparatus.

Amphibians should be well-suited for transporting occupants on both land and water equally efficiently. However, it will be understood from the prior art that most amphibians are more suited for transporting occupants on either land or water, rather than both.

In order to provide good speed and maneuverability on land, suspension arms, drive shafts and wheels are often located at lower regions of the amphibian, often protruding directly from a hull section of the amphibian and/or parts of the amphibian that would be submerged during use on water. Further, even though retractable suspension has been described in the prior art, the suspension, drive shaft and/or wheel—in the retracted position—is often left exposed to water, when in use on water. Further, cut-out portions or other abnormalities to the shape of the hull may be provided in the hull section of the amphibian to accommodate the suspension apparatus, drive shaft or wheel, when the wheel is in either of the retracted or protracted, vehicle-supporting positions. The protracted position would be with the wheels in place for use of the amphibian on land. Whilst the prior art designs provide hulls that are buoyant and water-tight, a significant disadvantage is also found in that they often have cut-outs, abnormalities, and/or parts of the suspension apparatus, drive shaft or wheel that are submerged and/or simply contactable by water—even when retracted—in use of the amphibian on water. This clearly alters the hydrodynamics of the hull section of the amphibian, making the amphibian perform less well on water—especially if the cut-outs, abnormalities, and/or parts of the suspension apparatus, drive shaft or wheel are located in the planing surface of the hull. In particular, large cut-outs for locating retracted wheels can have a great impact on the speed and maneuverability of the amphibian in use on water. For example, the amphibian may tend to "dig-in" at the back of an open wheel arch when turning on water.

The present invention is aimed at reducing at least some of the above-mentioned disadvantages of the prior art.

According to a first aspect, the present invention provides an amphibian for use on land and water, comprising:

a hull having a planing surface which contacts water when the amphibian is planing on water;

at least one retractable suspension apparatus which is movable from a vehicle supporting position to a retracted position; wherein the retractable suspension apparatus comprising for each wheel upper and lower suspension arms that are pivotably connected at inboard ends to a support structure within the hull and are pivotably connected at outboard ends with a suspension upright, the upper suspension arm being pivotably connected to the suspension upright by a first, upper pivot connection and the lower suspension arm being pivotably connected to the suspension upright by a second, lower pivot connection;

the suspension upright extending from the second connection, in a direction away from the first connection to a wheel hub mount location at which the wheel hub is rotatably mounted on the suspension upright at a location remote from the first and second pivot connections;

the suspension upright when deployed in land use extending externally of the hull across an outer face and/or a side face of the planing surface; and the lower suspension arm remaining above a top of the planing surface throughout use of the amphibian on land.

Preferably, the suspension arms extend from within the hull over an outer edge of the hull.

Most preferably, the wheel hub is located a distance from the second connection at least equivalent to the distance between first and second connections. Further, the hub may be located at least around 5 cm, 10 cm, 15 cm or 20 cm from the second connection.

Preferably, the wheel hub is rotatably mounted on the suspension upright at a distal end of the suspension upright.

The wheel hub is, preferably, driven to rotate by a transmission relaying drive from a prime mover of the amphibian. The transmission may have a step-down drive section in which drive is taken from a location at or above the lower pivot connection and is relayed along or alongside the suspension upright to the driven wheel hub.

Alternatively, the wheel hub may be driven by a hub motor. Preferably, the hub motor is a hydraulic motor or an electric motor.

Most preferably, the hull is a vee hull.

The amphibian may comprise a spring and damper assembly connected between one of the suspension arms and the support structure.

Preferably, the amphibian comprises a retractable and extendable actuator operable to move the retractable suspension apparatus from the vehicle supporting position to the retracted position and vice versa. Further preferably, the actuator is also operable to vary ground clearance by varying the suspension height.

The support structure, preferably, comprises a rotatable support arm which is pivotally mounted at one end to a fixed part of the support structure and to which is pivotally connected the actuator, the actuator being pivotally connected at one end to the support arm and being pivotally connected at the other end to a fixed part of the support structure, a/the spring and damper assembly being pivotally connected at one end to the rotatable support arm and at the other end to the lower suspension arm.

Preferably, the amphibian comprises a vehicle body comprising a hull section wherein, the at least one retractable suspension apparatus is connected to the vehicle body to locate the at least one retractable suspension apparatus externally of the hull section, in a vehicle-supporting position, and the elongate suspension upright extends from above the planing surface to a wheel mount location, such that no cut-out is required in the planing surface to accommodate the at least one retractable suspension apparatus in retracted and vehicle supporting positions.

Preferably, the at least one retractable suspension apparatus is connected to the vehicle body above the hull section, or above the planing surface.

Preferably, the planing surface is directly contactable with water, when in use on water.

Preferably, the amphibian comprises a vehicle body comprising the hull section comprising no cut-outs, abnormalities or discontinuities in the planing surface thereof which would have the effect of adversely altering the hydrodynamics of the hull section, the planing surface being for contacting water when in use on water, the at least one retractable suspension apparatus is connected to the vehicle body to locate the at least one retractable suspension apparatus externally of the hull section in a vehicle-supporting position and comprises the elongate suspension upright, which extends from above the planing surface to a wheel mount location, in which vehicle-supporting position the suspension assembly is lockable for land use in a spaced relationship from the hull section and/or planing surface, such that no cut-out, abnormality or discontinuities is/are required in the planing surface to accommodate the at least one retractable suspension apparatus in retracted and in vehicle-supporting positions, wherein the at least one retractable suspension apparatus comprises retraction means which is connected to the vehicle body and at least part of an inboard-facing region of the retractable suspension apparatus to provide movement from a vehicle-supporting position to a retracted position above the water line.

Further preferably, the suspension assembly is arranged to be lockable without the suspension assembly contacting the hull section and/or the planing surface.

The retractable suspension apparatus may comprises a double wishbone arrangement providing connection of the vehicle body and elongate suspension upright in two vertically spaced-apart locations, in a vehicle-supporting position.

Preferably, the amphibian comprises:

a vehicle body comprising the hull section comprising no cut-outs, abnormalities or discontinuities in the planing surface thereof which would have the effect of adversely altering the hydrodynamics of the hull section, the planing surface being for contacting water when in use on water; and the at least one retractable suspension apparatus which is movable from a vehicle-supporting position to a retracted position;

wherein the at least one retractable suspension apparatus is connected to the vehicle body to locate the at least one retractable suspension apparatus externally of the hull section in a vehicle-supporting position, and comprises:

the elongate suspension upright, which extends from above the planing surface to a wheel mount location; and steering apparatus, movable with the retractable suspension apparatus, that is capable of connecting steering input from a user of the amphibian with one or more rotationally-connected parts of the suspension apparatus to provide steering of the amphibian;

such that no cut-outs, abnormalities or discontinuities are required in the planing surface to accommodate the at least one retractable suspension apparatus and steering apparatus in retracted and in vehicle-supporting positions.

Preferably, the amphibian is arranged to accommodate a user on the amphibian, in a rider-like fashion.

Further preferably, the steering apparatus comprise a handlebar arrangement for receiving a user's steering input.

The retractable suspension apparatus may comprises a pivotal connection with respect to the vehicle body which allows the elongate suspension upright to be laterally rotatable with respect to the ground, to provide steering of a wheel mountable at the wheel mount.

Advantageously, the amphibian of the present invention substantially reduces, or removes totally, the necessity to have cut-outs, abnormalities, discontinuities and/or parts of the suspension apparatus, drive shaft or wheel in the planing surface or that are submerged and/or simply contactable by water—even when retracted—in use of the amphibian on water. Accordingly, the hydrodynamics of the hull are improved.

An embodiment of the invention is provided by an amphibian for use on land and water, comprising at least one retractable suspension apparatus which is movable from a vehicle supporting position to a retracted position, the retractable suspension apparatus comprising, in a vehicle supporting position, upper and lower suspension arms operably-connected to a suspension upright, the suspension upright for receiving one or more wheels, wherein the suspension upright comprises a step-down drive for receiving an input drive from a relative higher location and providing an output drive to a relative lower location. The step-down drive may be integral with the suspension upright or may be provided in addition to the suspension upright. When the step-down drive is provided in addition to the suspension upright, the step-down-drive may be located alongside the suspension upright and operably-connected thereto. The step-down drive may be a geared apparatus, or a chain, a belt or a shaft driven apparatus. The retractable suspension apparatus may comprise a wishbone-type suspension.

As used herein, the terms 'cut-out', 'abnormality' and 'discontinuity' are used to describe a part of a prior art hull which causes an adverse alteration to the hydrodynamics of the hull. Such cut-outs, abnormalities and/or discontinuities may have various forms, including in particular, a removed hull-section for receiving a wheel of an amphibian or part of the suspension, steering or drive means of the amphibian. Further, cut-outs, abnormalities and/or discontinuities include interruptions in the surface of the hull that have a trailing edge in a substantially-transverse orientation to the direction of movement of the amphibian. That is, from substantially-left to substantially-right of the vehicle or vice versa, which edges face forwards and can 'dig-in' to the water when the amphibian is moving.

The planing surface of the hull is a part of the hull which contacts water whilst the amphibian is planing on the surface of the water. Of course, this definition includes parts of the hull that are contactable at faster and slower planing speeds and when the amphibian is turning whilst planing—which it will be understood by those skilled in the art will likely include areas of the hull that do not contact water when planing in a straight line.

In order that the invention may be fully disclosed, embodiments will now be described, by way of example only, with reference to the accompanying drawings, in which:

FIGS. 5A and 5B are cross-sectional plan views of portions of hulls of amphibians, in which FIG. 5A is an amphibian according to the present invention and FIG. 5B is a prior art amphibian having cut-outs.

Figure 1:
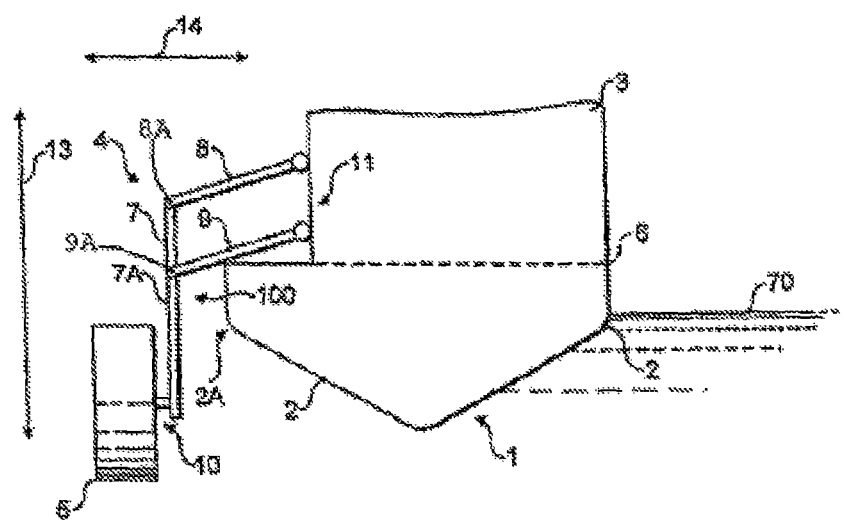
FIG. 1 is a simplified partial-cross-sectional view of a first embodiment of amphibian according to the present invention.

A simplified view of part of an amphibian is shown in FIG. 1, in which the amphibian is, generally, indicated by reference 1. The amphibian 1 includes a hull section 2, a vehicle body 3 and a suspension apparatus 4, including a wheel 5. In this particular embodiment, the demarcation between the hull section 2 and the vehicle body 3 is shown by the dotted line indicated by reference 6. Most preferably, the hull 2 provides a planing surface for contacting water when the amphibian 1 is planing. The amphibian 1 includes a regular hull 2 having a 'V' shape, for aiding manoeuvrability. The vehicle body 3 includes any feature of the amphibian which is not defined in relation to the hull section 2 or the suspension apparatus 4. Accordingly, a suspension support structure 11 is provided as part of the vehicle body 3, and is provided to receive parts of the suspension apparatus 4. The support structure 11 may be directly connected to an internal surface of the hull 2. The support structure 11 may also comprise part of a vehicle frame (not shown). Reference 70 indicates a possible water level on the hull 2, below which portions of the hull 2 form a planing surface. However, it will be understood by those skilled in the art that the size and shape of the planing surface depends upon, at least, the size of hull and the speed at which the amphibian 1 is travelling on water.

As shown in FIG. 1, the suspension apparatus 4 includes a suspension upright 7, also known as a king pin, and first and second lateral suspension arms 8 and 9. The suspension upright 7 is approximately transverse to the suspension arms 8, 9, in a vertical plane. An upper lateral suspension arm 8 is connected to the vehicle body 3 at a first end, and to the suspension upright 7 at a second end. The connection between the upper lateral suspension arm 8 and the suspension upright 7 is referred to as the first, upper pivot connection 8A. Both connections are pivotal connections allowing the respective parts of the suspension apparatus 4 to move. The lower suspension arm 9 is also connected to the vehicle body 3 and to the suspension upright 7. The connection between the lower suspension arm 9 and the suspension upright 7 is referred to as the second, lower pivot connection 9A. Again, the connections are pivotal connections, allowing respective movement of the suspension apparatus 4. By way of example, the suspension apparatus 4 can move in a vertical plane to the ground and a horizontal plane to the ground, as shown by arrows indicated by references 13 and 14, respectively, when moving between vehicle supporting and retracted positions of the apparatus 4. As can be seen from FIG. 1, the suspension upright 7 includes an extended suspension upright 7A which extends from the connection of the lower lateral suspension arm 9 in an opposite direction to the upper lateral suspension arm 8. A hub 10 for receiving a wheel 5 is located at or around a distal end of the extended suspension upright 7A, in a location that is remote from the suspension arm connections. Advantageously, provision of an extended suspension upright 7A allows the suspension apparatus 4 to be connected to the amphibian 1, such that, no cut-out is required in the submerged surface—or planing surface—to accommodate the at least one retractable suspension apparatus in retracted or in vehicle supporting positions.

As can be seen from FIG. 1, the suspension upright 7, when deployed in land use, extends externally of the hull 2 across an outer face 2A and/or a side face 2A of the planing surface. It will be understood by a skilled person that where the side face 2A, outer face 2A, or top of the planing surface are referred to, these parts would not be supporting the weight of the amphibian in normal operation when planing. The weight is, of course, substantially supported by the V-part of the hull 2. However, those parts do provide some of the volume of the hull 2, and are parts of an outer body surface which keeps water away from the mechanical parts within said body surface.

Further, as can be seen from FIG. 1, the suspension apparatus 4 is provided in a spaced-relationship from the hull 2 or the outer face 2A and/or side face 2A, and a gap 100 is provided such that the suspension apparatus 4 does not contact the hull 2.

Figure 2:
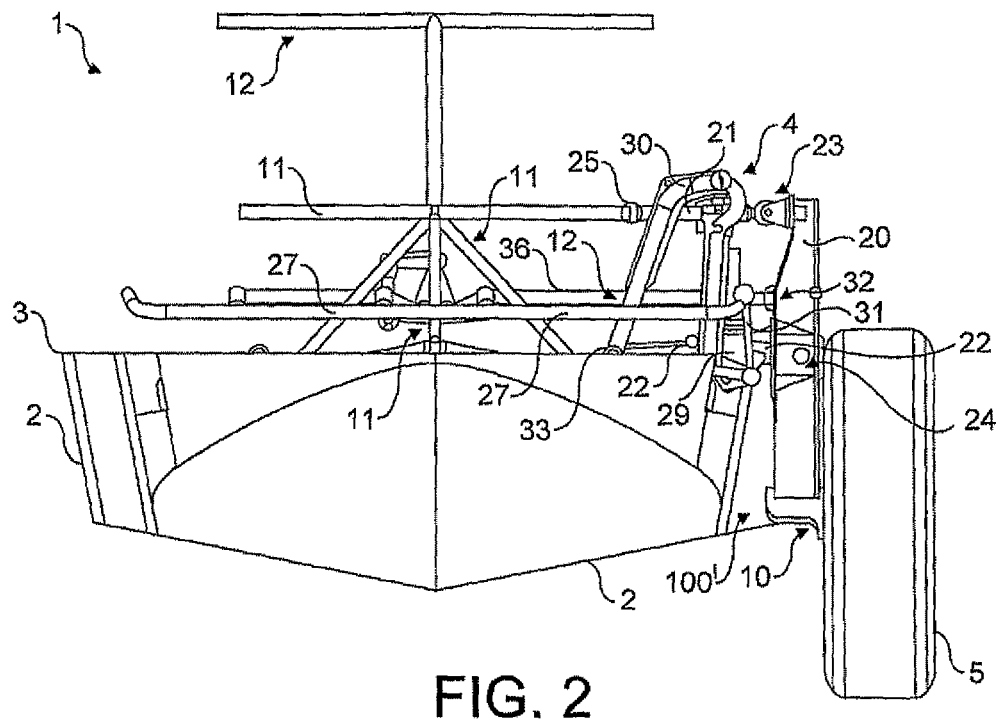
FIG. 2 is a partial-front view of an amphibian according to a second embodiment of the present invention, showing a wheel in a vehicle-supporting position.
Figure 3:
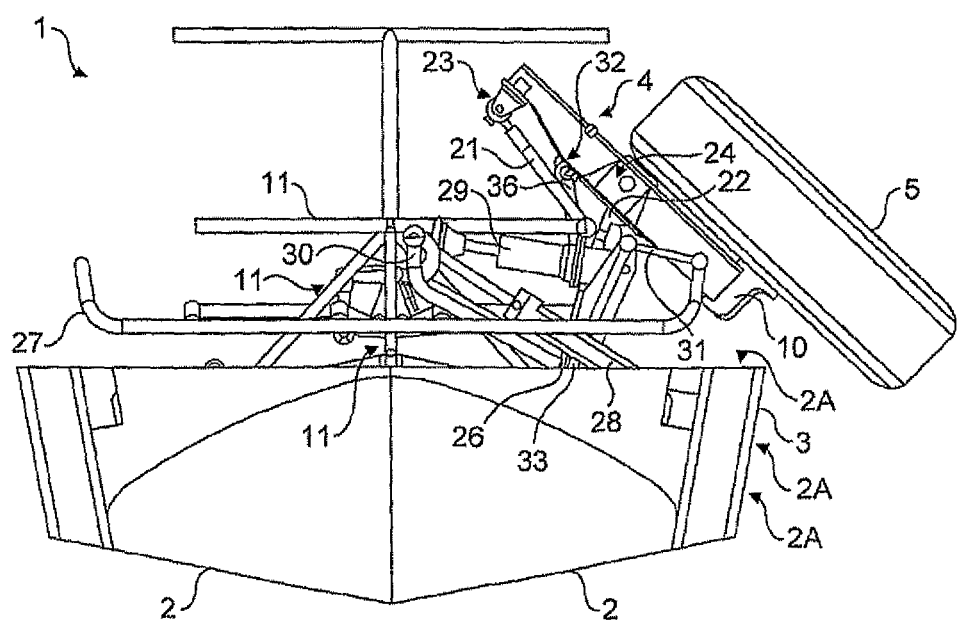
FIG. 3 is a partial-front view of an amphibian according to FIG. 2, showing a wheel in a retracted position.

FIGS. 2 and 3 show a second embodiment of amphibian according to the present invention. Like references have been used to identify common features, which features will not be discussed in detail. In particular, the differences between the first embodiment and this embodiment will be described.

The amphibian 1 includes a hull 2, a vehicle body 3, a suspension apparatus 4 and a wheel 5. Also provided are a suspension support structure 11—which is connected directly with the vehicle body 3—and a steering apparatus 12.

The suspension apparatus 4 comprises a suspension upright 20, also known as a king pin, an upper lateral suspension arm 21 and a lower lateral suspension arm 22. In particular, the upper and lower lateral suspension arms 21, 22 are wishbone-type suspension arms. The upper suspension arm 21 is operably-connected to the suspension upright 20 at a relative upper region of the suspension upright, when compared to the relative lower connection of the lateral suspension arm 22 and the suspension upright 20. Accordingly, a first, upper pivotal connection 23 is provided between the upper suspension arm 21 and the suspension upright 20. Further, a second, lower pivotal connection 24 is provided between the lower suspension arm 22 and the suspension upright 20. At opposed ends of the suspension arms 21,22, one or more pivotal connections 25 is/are provided between the upper suspension arm 21 and an upper part of the support structure 11 and one or more pivotal connections 26 (and/or 33) is/are provided between the lower suspension arm 22 and a lower part of the support structure 11. An anti-roll bar 27 is also provided to link the suspension apparatus 4 to a second suspension apparatus (not shown) which would be located opposite the first apparatus 4.

Further, as can be seen from FIG. 2, the suspension apparatus 4 is provided in a spaced-relationship from the hull 2 and a gap 100' is provided such that the suspension apparatus 4 does not contact the hull 2. In this Figure, the hull 2 is shown to taper towards a bow of the amphibian 1, which may give the impression that the suspension apparatus 4 is in contact with the hull 2; however, despite this, the suspension apparatus does not contact the hull and is, therefore, provided in a spaced-relationship.

As shown in FIG. 3, in particular, the suspension apparatus 4 includes a retraction unit comprising a retraction ram 28, for moving the suspension apparatus 4 and wheel 5 from the vehicle-supporting position to the retracted position. By way of example, FIG. 2 shows the suspension apparatus 4 and wheel 5 in a vehicle-supporting position. Further, FIG. 3 shows the suspension apparatus 4 and wheel 5 in a retracted position. A first, upper end of the retraction ram 28 is connected to a rotatable support arm 30, which forms part of the support structure 11. The second, lower end is connected to the vehicle body 3.

Also, as shown in FIG. 3 in particular, a damper and spring assembly 29 is provided to allow the upper and lower suspension arms 21,22 and suspension upright 20 to operate as a conventional suspension. A first end of the damper and spring assembly 29 is connected to the arm 30 and the second end of the damper and spring assembly 29 is connected to the lower suspension arm 22. The arm 30 is pivoted at an opposite end to the connections with the retraction ram 28 and the damper and spring assembly 29, and provides a pivot point 33, which is common with at least one of the pivotal connections 26, around which the wheel 5 and parts of the suspension apparatus 4 can rotate between vehicle supporting and retracted positions.

In order to allow the suspension apparatus 4 to move from a vehicle-supporting position to a retracted position, both the upper and lower suspension arms 21, 22 are provided with a pivot point along their length, to allow the suspension arms 21, 22 to be moved between retracted and protracted positions. The upper suspension arm is pivotal around the pivot point(s) 25, provided at the junction of the suspension arm 21 and the support structure 11. The lower suspension arm 22 is pivotal around pivot point(s) 26,33, provided at the junction of the lower suspension arm 22 and the support structure 11. In particular, a part of the lower suspension arm 22 is rigidly connected with the arm 30 so that they are movable together. Further, a drop link 31 is provided between the anti-roll bar 27 and the lower suspension arm 22, to provide increased rigidity and strength.

FIG. 3 shows, in particular, outer faces 2A and/or side faces 2A of the planing surface across which the suspension upright 20 extends, when deployed for land use.

Figure 6:
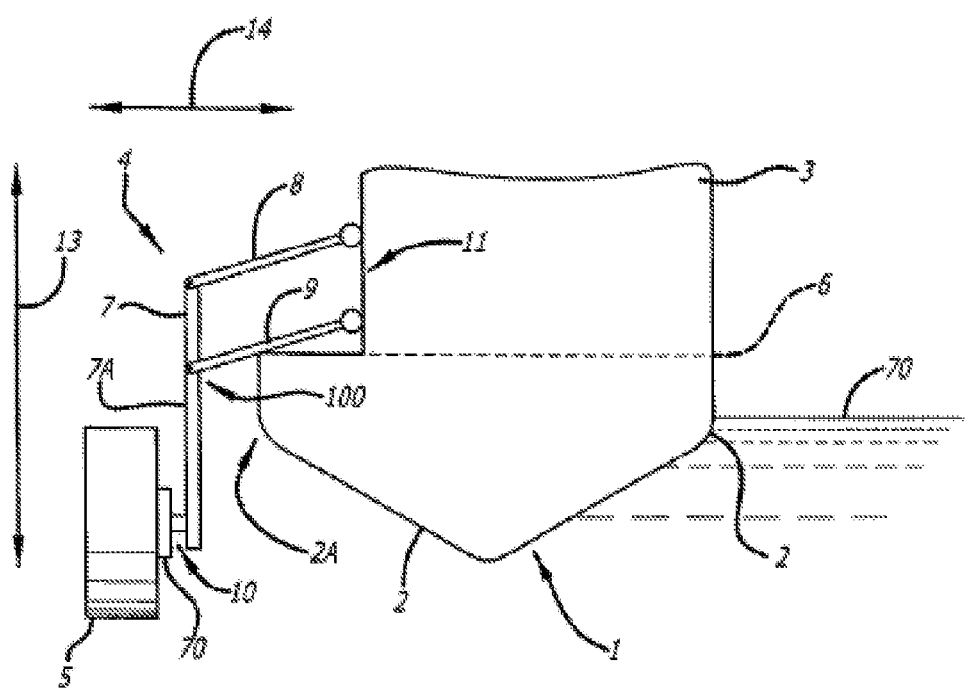
FIG. 6 is a simplified partial-cross-sectional view of the embodiment of FIG. 1 showing a hub motor which drives the wheel.

The suspension apparatus of FIGS. 2 and 3 show a front-wheel only of an amphibian 1. However, the suspension apparatus 4 may be used on any of the wheels of an amphibian 1. In particular, although the amphibian 1 shown in FIGS. 2 and 3 has no drive going to the wheel 5, the wheel 5 may be a driven wheel. Further, in order to drive that wheel 5, a step-down drive (not shown) may be provided as an integral structure with the suspension upright or in addition to the suspension upright. As known by those skilled in the art, a step-down drive is capable of receiving an input drive from a relative higher location and producing an output drive to a relative lower location. Alternatively, the wheel hub 10 may be driven by a hub motor 70 shown schematically in FIG. 6. The hub motor 70 may include one or more hydraulic motors, or one or more electric motors.

By way of an alternative, the retraction ram 28 or the damper and spring assembly 29 may be manually adjusted for varying the ground clearance of the amphibian 1.

Although the suspension apparatus 4 shown in FIGS. 2 and 3 is drive-less, that suspension apparatus 4 includes apparatus 12 used for steering the amphibian 1. The steering apparatus 12 includes an arm 36 which is operably connected, at connection 32, to the suspension upright 20 in a mid-region of the suspension upright 20, preferably between the connections 23 and 24. The other end of the arm 31 is connected to input steering means, for example, handle bars or a steering wheel (not shown).

FIGS. 1, 2 and 3 show only one suspension apparatus 4 and wheel 5 attached to the vehicle body 3. However, it will be understood that any number of wheels could be used, in particular 3 or 4 wheels, and an appropriate number of suspension apparatuses 4. Further, the wheels 5 may be driven or drive-less.

Figure 4A:
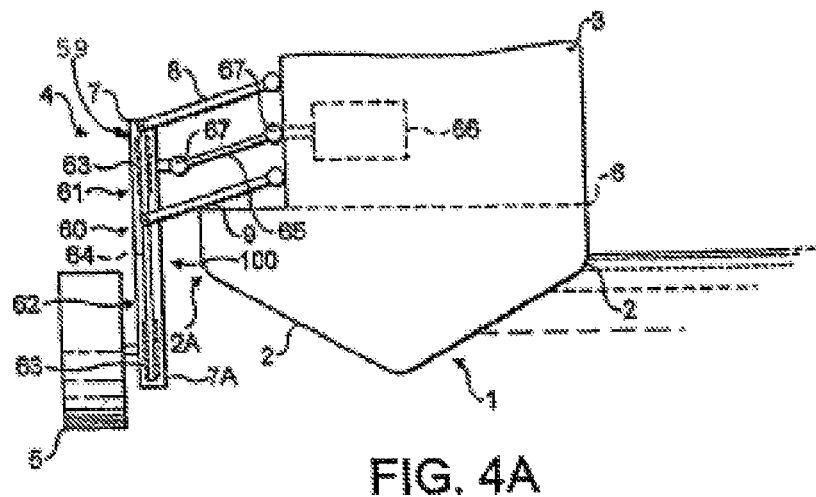
FIG. 4A is a simplified partial cross-sectional view of an amphibian according to the present invention, having a step-down drive.
Figure 4B:
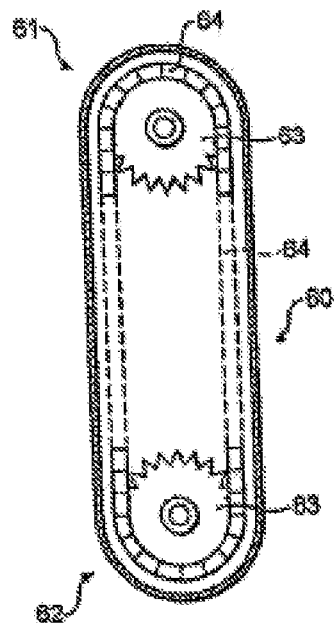
FIG. 4B is a partial cross-sectional view of the step-down drive of FIG. 4A.

FIG. 4A shows an embodiment of the present invention which is similar to that shown in FIG. 1. Accordingly, like references have been utilised for common features and only the differences will be discussed. In particular, a transmission relaying drive 59 includes a step-down drive 60 to drive the wheel 5. Further, as can be seen from FIG. 4A, the suspension apparatus 4 is provided in a spaced-relationship from the hull 2 and a gap 100 is provided such that the suspension apparatus 4 does not contact the hull 2. As shown in FIG. 4B in particular, the step-down drive includes an upper input end 61 and a lower output end 62, when the suspension apparatus 4 is in its vehicle-supporting position. A cog 63 is provided at each end 61,62 and is linked by a chain 64, so that when either cog 63 is moved, corresponding rotation of the other cog 63 is provided. The cog 63 at the input end 61 is driven by a shaft 65, itself driven directly or indirectly by a prime mover, as exemplified by an engine 66. One or more universal joints 67 or equivalents are used to connect the engine 66, shaft 65 and cog 63. The cog 63 at the output end 62 drives the wheel hub 10 and the wheel 5. Accordingly, an input drive from a prime mover is stepped-down to a lower height with respect to the ground the amphibian is standing on to drive one or more wheels.

Figure 5A:
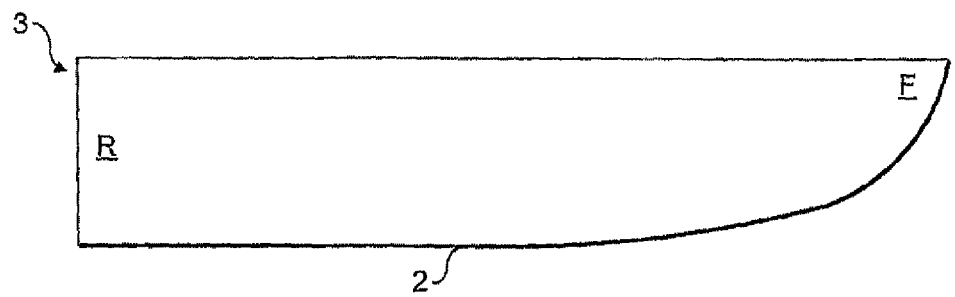
Figure 5B:
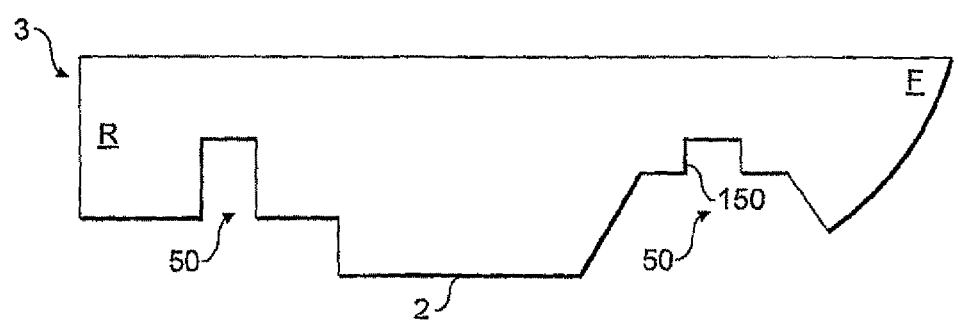

FIG. 5A shows a hull of an amphibian according to the present invention. The hull is shaped to provide good hydro-dynamics. Further, no cut-out or other abnormalities, and/or parts of the suspension apparatus, drive shaft or wheel would be submerged and/or contactable by water, when the amphibian has the suspension apparatus 4 retracted, for use on water. By contrast, FIG. 5B shows a hull of an amphibian in which cut-outs 50 are provided to locate the suspension apparatuses and/or wheels in a retracted position thereof. Accordingly, a hull shown in FIG. 5A has better hydro-dynamics than a hull shown in FIG. 5B; where numeral 150 denotes a trailing edge in a cut-out, as described on page 8 above. Reference F indicates the front and reference R the rear of the amphibians shown in FIGS. 5A and 5B.

The invention claimed is:

1. An amphibian for use on land and water, comprising:
a hull having a planing surface which contacts water when the amphibian is planing on water;
at least one retractable suspension apparatus which is movable from a vehicle supporting position to a retracted position; wherein
the retractable suspension apparatus comprising for each wheel upper and lower suspension arms that are pivotably connected at inboard ends to a support structure and are pivotably connected at outboard ends to a suspension upright, the upper suspension arm being pivotably connected to the suspension upright by a first, upper pivot connection and the lower suspension arm being pivotably connected to the suspension upright by a second, lower pivot connection;
the suspension upright extending from the second pivot connection, in a direction away from the first pivot connection to a wheel hub mount location at which the wheel hub is rotatably mounted on the suspension upright, the wheel hub receiving a wheel;
the suspension upright when deployed in land use extending externally of the hull; and
wherein the wheel hub is driven to rotate by a transmission relaying drive from a prime mover of the amphibian and the transmission relaying drive has a step-down drive section in which drive is taken from a location externally of the hull at or above the lower pivot connection to the driven wheel hub.

2. An amphibian according to claim 1, wherein the suspension arms extend from within the hull over an outer edge of the hull.

3. An amphibian according to claim 1, wherein the wheel hub is located a distance from the second connection at least equivalent to the distance between first and second connections.

4. An amphibian according to claim 1, wherein the hub is located at least around 5 cm, 10 cm, 15 cm or 20 cm from the second connection.

5. An amphibian according to claim 1, wherein the wheel hub is rotatably mounted on the suspension upright at a distal end of the suspension upright.

6. An amphibian according to claim 1, wherein drive is relayed along or alongside the suspension upright to the driven wheel hub.

7. An amphibian according to claim 1, wherein the hull is a vee hull.

8. An amphibian according to claim 1, comprising a spring and damper assembly connected between one of the suspension arms and the support structure.

9. An amphibian according to claim 1, comprising an extendable actuator operable to move the retractable suspension apparatus from the vehicle supporting position to the retracted position.

10. An amphibian according to claim 9, wherein the extendable actuator is also operable to vary ground clearance.

11. An amphibian according to claim 9, wherein the support structure comprises a rotatable support arm which is pivotally mounted at one end to a fixed part of the support structure and to which is pivotally connected the extendable actuator, the extendable actuator being pivotally connected at one end to the support arm and being pivotally connected at the other end to a fixed part of the support structure, the spring and damper assembly being pivotally connected at one end to the rotatable support arm and at the other end to the lower suspension arm.

12. An amphibian as claimed in claim 1, comprising
a vehicle body comprising the hull, wherein, the at least one retractable suspension apparatus is connected to the vehicle body to locate the at least one retractable suspension apparatus externally of the hull, in a vehicle-supporting position, and the suspension upright extends from above the planing surface to a wheel mount location such that, no cut out and/or discontinuity is required in the planing surface to accommodate the at least one retractable suspension apparatus in retracted and in vehicle supporting positions.

13. An amphibian as claimed in claim 12, wherein the at least one retractable suspension apparatus is connected to the vehicle body above the hull.

14. An amphibian as claimed in claim 12, wherein the planing surface is directly contactable with water, when in use on water.

15. An amphibian as claimed in claim 1, comprising a vehicle body comprising the hull comprising no cut outs or discontinuities in the planing surface thereof which have the effect of adversely altering the hydrodynamics of the hull, the planing surface being for contacting water when in use on water, the at least one retractable suspension apparatus is connected to the vehicle body to locate the at least one retractable suspension apparatus externally of the hull in a vehicle-supporting position and comprises the suspension upright, which extends from above the planing surface to a wheel mount location, in which vehicle supporting position the suspension assembly is lockable for land use in a spaced relationship from the hull and/or planing surface, such that no cut out, abnormality or discontinuities is/are required in the planing surface to accommodate the at least one retractable suspension apparatus in retracted and in vehicle-supporting positions, wherein the at least one retractable suspension apparatus comprises retraction means which is connected to the vehicle body and at least part of an inboard-facing region of the retractable suspension apparatus to provide movement from a vehicle-supporting position to a retracted position above the water line.

16. An amphibian as claimed in claim 15, wherein the suspension assembly is arranged to be lockable without the suspension assembly contacting the hull and/or the planing surface.

17. An amphibian as claimed in claim 1, comprising:
a vehicle body comprising the hull section comprising no cut outs, or discontinuities in the planing surface thereof which would have the effect of adversely altering the hydrodynamics of the hull, the planing surface being for contacting water when in use on water; and
the at least one retractable suspension apparatus which is movable from a vehicle-supporting position to a retracted position;
wherein the at least one retractable suspension apparatus is connected to the vehicle body to locate the at least one retractable suspension apparatus externally of the hull section in a vehicle-supporting position, and comprises:
the suspension upright, which extends from above the planing surface to a wheel mount location; and
steering apparatus, movable with the retractable suspension apparatus, that is capable of connecting steering input from a user of the amphibian with one or more rotationally-connected parts of the suspension apparatus to provide steering of the amphibian; such that no cut outs or discontinuities are required in the planing surface to accommodate the at least one retractable suspension apparatus and steering apparatus in retracted and in vehicle-supporting positions.

18. An amphibian as claimed in claim 17, wherein the steering apparatus comprise a handlebar arrangement for receiving a user's steering input.

19. An amphibian as claimed in claim 17, wherein the retractable suspension apparatus comprises a pivotal connection with respect to the vehicle body which allows the elongate suspension upright to be laterally rotatable with respect to the ground, to provide steering of a wheel mountable at the wheel mount.

* * * * *